United States Patent [19]

Meyers

[11] Patent Number: 4,853,529

[45] Date of Patent: Aug. 1, 1989

[54] LIGHT LEVEL RESPONSIVE CONTROL FOR LIGHT INTENSIFIER IN NIGHT VISION SYSTEM

[76] Inventor: Brad E. Meyers, 17525 N.W. 67th Ct., Redmond, Wash. 98052

[21] Appl. No.: 152,436

[22] Filed: Feb. 5, 1988

[51] Int. Cl.⁴ .............................................. H01J 40/14
[52] U.S. Cl. ........................ 250/213 VT; 250/214 AG
[58] Field of Search ................. 250/213 VT, 214 AG; 307/116, 311

[56] References Cited

U.S. PATENT DOCUMENTS

| | | | |
|---|---|---|---|
| 3,739,178 | 6/1973 | Chow | 250/214 AG |
| 3,816,744 | 6/1974 | Chow | 250/214 AG |
| 4,707,595 | 11/1987 | Meyers | 250/504 |
| 4,755,725 | 7/1988 | Kastendieck et al. | 250/213 VT |

Primary Examiner—David C. Nelms
Assistant Examiner—Stephone B. Allen

Attorney, Agent, or Firm—Hughes & Multer

[57] ABSTRACT

The image intensifier (22) of night telescope (12) is protected by a deactivate circuit (FIG. 4) which is in series with an off-on switch (S) between a source of electrical energy (28) and the image intensifier (22). The light sensor (26) measures ambient light. If the light level is below a predetermined light level, at which it is safe to operate the image intensifier (22), the light sensor (26) does not conduct. This causes an amplifier circuit (A-1, A-2) to deliver a negative voltage to the base of a transistor (Q-1). This enables the transistor (Q-1) to transmit electrical current from the source (28) to the image intensifier (22). Whenever ambient light exceeds the predetermined light level, the photoconductive sensor (26) conducts. In response to this happening the amplifier circuit (A-1, A-2) delivers a positive voltage to the base of the transistor (Q-1). In response, the transistor (Q-1) becomes incapable of transmitting a current onto the image intensifier (22).

2 Claims, 2 Drawing Sheets

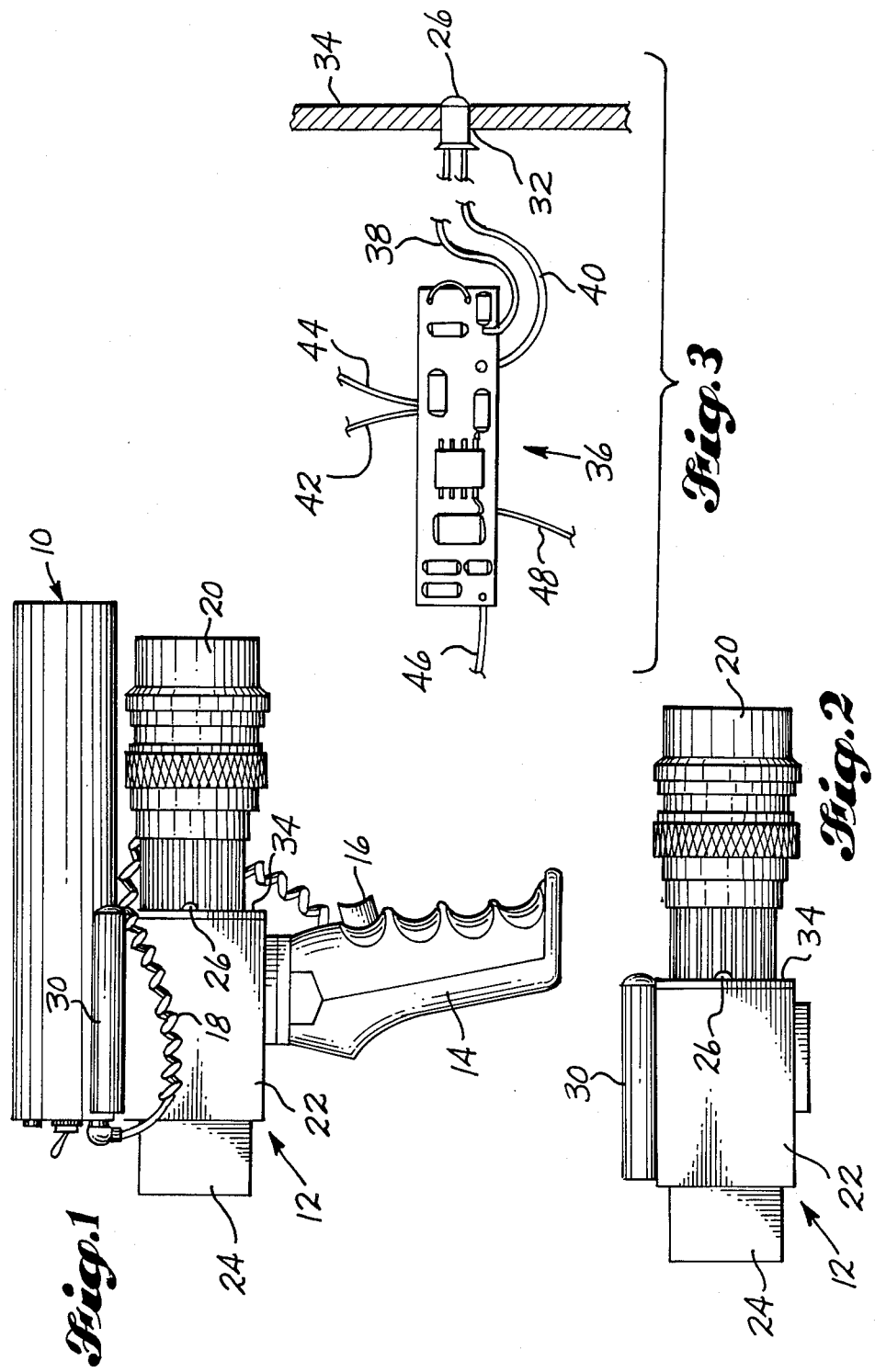

LIGHT LEVEL RESPONSIVE CONTROL FOR LIGHT INTENSIFIER IN NIGHT VISION SYSTEM

DESCRIPTION

1. Technical Field

This invention relates to a system for disabling a light intensifier of a type used in night vision systems whenever ambient light levels are sufficiently high that there would be a likelihood that the light intensifier would be damaged if turned on in such light.

2. Background Art

A typical night vision system is disclosed by my U.S. Pat. No. 4,707,595, issued to me on Nov. 17, 1987, and entitled Invisible Light Beam Projector And Night Vision System.

As disclosed in my U.S. Pat. No. 4,707,595, a night vision system includes a night vision telescope having an objective lens at its forward end, an image intensifier between its ends, and either an eye piece or a connection for a camera etc. at its rear end. The objective lens is chosen to have a high light gathering power. An image of the scene in front of the objective lens is formed on the front or image input of an input fiberoptic plate portion of the image input intensifier. The fiberoptic plate is comprised of a bundle of thin optic fibers whose ends form the front and rear bounding surfaces of the plate. Each of the optical fibers passes one element of the image formed on the input surface to a photocathode deposited on the rear surface of the fiberoptic plate. The resulting image formed on the photocathode is therefore a mosaic of such elements. Each of the fibers are sufficiently small so as not to limit the spatial resolution of the image intensifier. The photocathode is a photosensitive surface that emits electrons in a spatial pattern corresponding to the intensity of the optical image formed upon it by the objective lens. A suitable photocathic material is provided by evaporating in vacuum a combination of the alkali metals potassium, sodium, antimony and cesium and depositing them on a suitable transparent substrate. This process yields a photocathode with a sensitivity from the visible into the near-infrared spectral regions. The electrons emitted from the photocathode impinge on the input surface of a microchannel plate which multiplies them by thousands of times to the process of cascaded secondary emission. The multichannel plate consists of microscopic hollow-glass electron conducting channels fused into a disk-shaped array. The walls of these channels are especially processed to produce secondary electrons. Voltage is applied across the disk faces so that each microscopic channel represents a separate, high gain electron multiplier. The voltage is supplied by batteries housed in a housing which may be located atop the image intensifier. When an electron impinges upon the electron surface channel plate, secondary electrons are generated. The secondary electrons are accelerated through the channels by the applied voltage, colliding with the channel surfaces to discharge additional secondary electrons, thereby producing electron multiplication. By varying the voltage across the disk, the gain of the multiplier can be controlled. These electrons, now increased in number and energy, impinge on a phosphor screen deposited on the front surface of a fiberoptic output plate. The phosphor is suitably a yellow-green phosphor having a spectral emission centered about 550 nanometers. As in the input fiberoptic plate, the output fiberoptic plate is also comprised of a bundle of optical fibers which relays the image to a back or output phase of the fiberoptic plate. However, the bundle is constructed of a 180 degree twist in order to invert the otherwise upside down image produced by the object lens. An image intensifier of the type described is produced by the Litton Electron Tube Division of Litton Systems, Inc. of Tempe, Ariz., as Image Intensifier Tube Model L-4261. Other known types of image or light intensifiers are available from a number of different commercial sources.

The image intensifier tube can be damaged if power is applied to it during the daytime or when the user is in a lighted room. The principal object of the present invention is to provide a protective control system for the image intensifier tube of a night telescope which senses ambient light and if the light level is such that the image intensifier tube could be damaged if turned on, the power circuit to the image intensifier tube is deactivated and stays deactivated until the light level drops to a safe level. In other words, a turning on of the night vision telescope will not result in any power delivery to the image intensifier tube until the ambient light drops to a level at which it becomes safe to operate the image intensifier tube.

DISCLOSURE OF THE INVENTION

The subject invention is basically characterized by a night vision telescope of a type comprising an electrically powered image intensifier. The telescope includes a source of electrical energy for operating the image intensifier and a control circuit. The control circuit includes an off-on switch and a deactivate circuit that is in series with the off-on switch between the source of electrical energy and the image intensifier. The deactivate circuit comprises a photoconductive light sensor and switch means responsive to light signals received by the photoconductive light sensor for conducting current from the source of electrical energy to the image intensifier only when (1) the off-on switch is on, and (2) the light being sensed by the photoconductive light sensor is at a safe level below a predetermined threshold level. The switch means is off and prevents current flow to the image intensifier when the light being sensed by the photoconductive light sensor is above the predetermined level.

In preferred form, the deactivate circuit is on a circuit board which is housed within a housing portion of the night vision telescope. A wall of the housing portion may include an opening in which the photoconductive light sensor is mounted. The photoconductive light sensor may have a body portion which is snugly received within an opening and an outer end, light receiving lens portion which is directed outwardly of the housing, to pick up ambient light.

Preferably, the switch means responsive to light signals received by the photoconductive light sensor is a PNP transistor having an input, an output and a base. The base is connected in the deactivate circuit to receive current from the source of electrical energy and the output is connected to deliver current to the image intensifier. The deactivate circuit includes amplifier means connected between the photoconductive light sensor and the base of the transistor. The amplifier means is connected to receive operating electrical energy from the source of electrical energy. The amplifier means functions to deliver a negative voltage to the base of the transistor in reponse to the photoconductive light sensor sensing a light level below the predetermined light level. This causes the transistor to conduct current from the source of electrical energy to the image intensifier whenever the off-on switch is on. The amplifier menas further functions to transmit a positive voltage to the base of the transistor in response to the photoconductive light sensor sensing a light level which is above the predetermined light level. This turns the transistor off, so that no current will flow through it to the image intensifier and the image intensifier will be deactivated until the ambient light level falls below the predetermined light level.

Other objects, advantages and features of the invention will be apparent from the detailed description of the illustrated embodiment.

BRIEF DESCRIPTION OF THE DRAWINGS

In the drawings, like reference characters are used to designate like parts throughout the several views, and:

FIG. 1 is a side elevational view of a night vision system of a type with which the present invention has a use, such view showing an invisible light projector mounted on top of the body portion of the night vision telescope;

FIG. 2 is also a side elevational view but of a night vision telescope only;

FIG. 3 is a view showing a fragmentary wall portion of a night vision telescope on which a light sensor is mounted, in spaced relationship to a small circuit board which is housed within the night vision telescope.

BEST MODE FOR CARRYING OUT THE INVENTION

Figure 4:
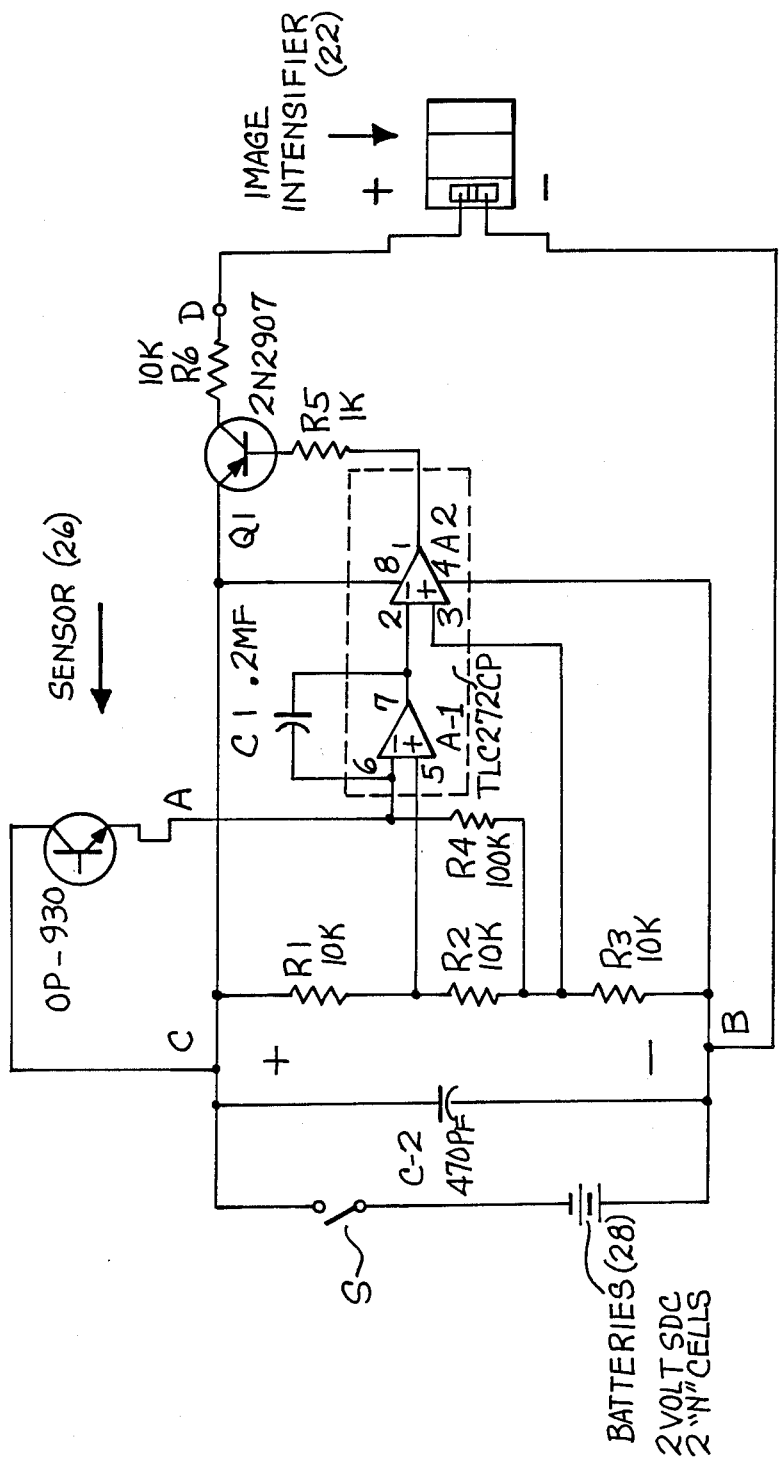
FIG. 4 is a schematic diagram of an embodiment of the protective control system of the invention.

FIG. 1 shows an invisible light projector 10 mounted adjacent to a night viewing telescope 12. The telescope 12 is shown mounted onto a pistol grip type handle 14. The invisible light projector 10 is in turn shown mounted onto the housing of the telescope 12. The pistol grip handle 12 includes a control trigger 16 which is connected by an electrical chord 18 to a control circuit for the invisible light projector which is located within the housing of the invisible light projector 10. The invisible light projector 10 is described in detail in my aforementioned U.S. Pat. No. 4,707,595.

The night vision telescope 12 shown by FIGS. 1 and 2 has an objective lens 20 at its forward end, a light or image intensifier 22 between its ends and either an eye piece 24 or a connection for a camera (not shown), etc. at its rear end. According to the invention, a side portion of the housing for the image intensifier is formed to include an opening in which a light sensor 26 is mounted, with its light receiving end directed outwardly of the housing. The electrical power source for the image intensifier 22 is a pair of batteries 28 (schematically shown in FIG. 4) housed within a battery casing 30 mounted atop the housing for the image intensifier 22. The batteries 28 also power the control circuit for disabling the image intensifier 22.

Referring to FIG. 3, the light sensor 26 is shown mounted within an opening 32 formed in a sidewall portion 34 of the housing for the light intensifier 22. The two leads of the light sensor 26 are connected by wires 38, 40 to connector points on a circuit board 36 which carries the portion of the circuit shown in FIG. 4 exclusive of the sensor 26 the batteries 28 and the image intensifier 22. The wires 38, 40 connect the two leads of the light sensor 26 to the circuit board 36 at points A, C. In similar fashion, a pair of wires connect the image intensifier 22 to the circuit board 36 at points B, D. A third pair of wires connects the batteries 28 to the circuit board 36 at points B, C. The various wires 38, 40, 42, 44, 46, 48 are of sufficient length so that they can be bent or folded to permit the placement of the circuit board 36 into a position closely adjacent a sidewall portion of the housing for the image intensifer 22. The circuit board 36 is positioned where there is room for it and then the wires 38, 40, 42, 44, 46, 48 are folded and tucked into a space adjacent the circuit board 36.

Referring to FIG. 4, light sensor 26 is a photoconductive device having a lens at its outer end for receiving ambient light. Sensor 26 is in effect an off-on switch in each portion of the circuit. When the ambient light level is below a predetermined level, the light sensor 26 will not conduct.

Resistors R-1, R-2 and R-3 form a voltage divider. The connection between R-2 and R-3 is substantially at 50% of the battery input voltage. The voltage between R-1 and R-2 is slightly more positive than a few microvolts. This voltage is connected to the plus terminal 5 of amplifier A-1. Sensor 26 is connected to resistor R-4 which is referenced back to the voltage divider circuit. The resistance of light sensor 26 is very high when no light is received. As a result, whenever the light sensor 26 is exposed to a light level below its designed light level the voltage at the negative terminal of amplifier A-1 is of a value which give amplifier A-1 a positive output.

Whenever the light being sensed by the light sensor 26 is above the designed light level, the light sensor 26 conducts and causes the voltage at the negative input 6 of amplifier A-1 to become more positive than the positive input at 5, resulting in amplifier A-1 having a negative output.

The function of capacitor C-1 is to provide an integration of the signal so that rapidly fluctuating signals (e.g. such as sixty cycle light pulses received from sodium vapor lamps, incandescent lamps, mercury vapor lamps, etc.) will not pulse the amplifier A-1.

The output from amplifier A-1 is applied to the negative input 8 of amplifier A-2. The positive input 3 of amplifier A-2 is connected to the voltage between resistors R-2 and R-3 which is substantially about fifty percent of the battery voltage that is applied to this system. As should be apparent, when the light level being sensed by the light sensor 26 is below the design level, a positive voltage is applied to both inputs 2 and 3 of amplifier A-1 and the output of amplifier A-2 is negative. When the light being sensed is above the design level, the output of amplifier A-1 becomes negative and the output of amplifier A-2 becomes positive.

The output of amplifier A-2 is applied through a current limiting resistor R-5 to the base of a PNP transistor Q-1 which functions as an off/on switch between the batteries 28 and the image intensifier 22. When the light level being sensed is below the design level, causing the amplifier circuit to apply the negative voltage at the base of the transistor Q-1, the transistor Q-1 will be on and will allow current flow through resistor R-6 and to the image intensifier 22. Resistor R-6 functions to limit the current in the event of a short circuit. Its presence provides some protection to the transistor Q-1 which without it could be destroyed by the short circuit. When light level sensed by sensor 26 is above the design level, and the amplifier circuit functions to provide a positive voltage at the base of the transistor Q-1, in the manner described above, transistor Q-1 will be turned off and there will be no current flow to the image intensifier 22.

It is to be understood that the embodiment shown by the drawing, and described above in reference to the drawing, is the best mode of the invention at this time, but yet is merely an example of a form that the invention may take. The scope and protection is to be determined by the following claims, interpreted in accordance with the rules of patent claim interpretation, including use of the doctrine of equivalents.

What is claimed is:

1. A night vision telescope, comprising:
    an electrically powered image intensifier;
    a source of electrical energy for operating said image intensifier; and
    a control circuit including an off-on switch and a deactivate circuit in series with said off-on switch between said source of electrical energy and said image intensifier, said deactivate circuit comprising a photoconductive light sensor and switch means responsive to light signals received by said photoconductive light sensor for conducting current from the source of electrical energy to the image intensifier, when the off-on switch is on and the light being sensed by the photoconductive light sensor is at a level below a predetermined level, and preventing such current flow when the light level being sensed by the photoconductive light sensor is above said predetermined level;
    wherein the switch means responsive to light signals received by said photoconductive light sensor is a PNP transistor having an input, an output and a base, and said input is connected in said deactivate circuit to receive current from the source of electrical energy and the output is connected to deliver current to the image intensifier, and said deactivate circuit includes amplifier means connected between the photoconductive light sensor and the base of the transistor, and is further connected to receive operating electrical energy from the source of electrical energy, said amplifier means functioning to deliver a negative voltage to the base of the transistor in response to the photoconductive light sensor sensing a light level below said predetermined light level, for causing the transistor to conduct current from the source of electrical energy to the image intensifier whenever the off-on switch is on, said amplifier means further functioning to transmit a positive voltage to the base of the transistor in respone to the photoconductive light sensor sensing a light level which is above the predetermined light level, for turning the transistor off, so that no current will flow through it to the image intensifier and the image intensifier will be deactivated until the ambient light level falls below the predetermined light level.

2. A night vision telescope according to claim 1, wherein the deactivate circuit is on a circuit board which is housed within a housing portion of the night vision telescope, and a wall of said housing portion includes a mounting opening for the photoconductive light sensor, and said photoconducting light sensor has a body portion which extends through said wall and is snugly received within said opening, an inner end inward of said wall and an outer end having a light receiving lens portion which is directed outwardly of the housing, to pick up ambient light.

* * * * *

UNITED STATES PATENT AND TRADEMARK OFFICE
CERTIFICATE OF CORRECTION

PATENT NO. : 4,853,529
DATED : 1 August 1989
INVENTOR(S) : Brad E. Meyers It is certified that error appears in the above—identified patent and that said Letters Patent is hereby corrected as shown below:

Column 1, line 25, delete "input".

Column 3, line 41, "12" should read --14--.

Signed and Sealed this

Second Day of April, 1991

*Attest:*

HARRY F. MANBECK, JR.

*Attesting Officer*  *Commissioner of Patents and Trademarks*